United States Patent [19]

Ashbrook

[11] Patent Number: 5,318,702
[45] Date of Patent: Jun. 7, 1994

[54] FLUID TREATING APPARATUS

[76] Inventor: Clifford L. Ashbrook, R.R. 2, Box 439, Spicewood, Tex. 78669

[21] Appl. No.: 900,130

[22] Filed: Jun. 18, 1992

[51] Int. Cl.$^5$ ............................................. C02F 1/20
[52] U.S. Cl. ........................................ 210/188; 95/200; 95/208; 210/199; 210/205; 210/257.1; 210/512.1
[58] Field of Search .................... 95/195, 200, 208; 210/738, 754, 787, 788, 199, 202, 205, 257.1, 258, 188, 512.1, 512.2

[56] References Cited

U.S. PATENT DOCUMENTS

| | | | |
|---|---|---|---|
| 2,773,029 | 12/1956 | Sebald | 210/177 |
| 3,288,292 | 11/1966 | Stone | 210/257.1 |
| 3,533,506 | 10/1970 | Carr | 210/787 |
| 3,539,009 | 11/1970 | Kudlaty | 210/257.1 |
| 4,261,521 | 4/1981 | Ashbrook | 241/5 |
| 4,645,606 | 2/1987 | Ashbrook et al. | 210/696 |
| 4,764,283 | 8/1988 | Ashbrook et al. | 210/696 |
| 4,957,626 | 9/1990 | Ashbrook et al. | 210/695 |
| 5,114,576 | 5/1992 | Ditzler et al. | 210/257.1 |
| 5,116,519 | 5/1992 | Michaluk | 210/787 |

*Primary Examiner*—Peter A. Hruskoci
*Attorney, Agent, or Firm*—Donald R. Comuzzi; Christopher L. Makay

[57] ABSTRACT

The present invention is a method and apparatus for treating water and other liquids by removing minerals in solution and entrained gases. The entrained gases are forced into the atmosphere, while the minerals are returned to agglomerated solids for ease in removal using settling or filtration. The opposed vortex nozzle unit of the present invention collides a pair of fluid streams in a manner that the bonds holding the gases and minerals in the water are broken, thus, allowing the gases to escape and the minerals to agglomerate. The vortex nozzle tubes of the present invention are provided with slots which remove a small portion of the fluid streams as they flow through the nozzle tubes. The removed water is returned at a location beyond the impingement point of the two streams in order to enhance the removal of gases and agglomeration of minerals in solution.

14 Claims, 3 Drawing Sheets

FLUID TREATING APPARATUS

BACKGROUND OF THE INVENTION

The present invention relates to a method and apparatus for treating water and other liquids by removing minerals in solution and entrained gases. The present invention allows the gases to escape into the atmosphere while agglomerating the solids for ease in removal as by settling and/or filtration.

Certain characteristics of water and other liquids containing entrained gases (e.g. $CO_2$ and/or $N_2$) and dissolved minerals (e.g. Ca and/or Fe) have been discussed in my U.S. Pat. No. 4,261,521. Further testing has revealed new information and uses for the basic apparatus disclosed therein. Although the apparatus of U.S. Pat. No. 4,261,521 may be used to disentrain gases and agglomerate solids of any fluid, for ease of understanding and disclosure, the fluid described will be water.

The molecular structure of water when in liquid form is an array of tetrahedrons made up of five individual $H_2O$ molecules bonded together such that one $H_2O$ molecule is positioned at each leg of the tetrahedron with a fifth positioned at its center. Additionally, impurities enter liquid water in the form of entrained gases and dissolved elemental minerals. That is, in addition to the individual $H_2O$ molecules which make up liquid water, impurities such as gases and minerals also bond with the individual $H_2O$ molecules to fashion part of the tetrahedral array. However, the bonds formed between the $H_2O$ molecules, gases, and minerals throughout the array are the weak bonds developed from valence electron sharing. Thus, the operation of the nozzle arrangement disclosed in my U.S. Pat. No. 4,261,521 functions to break those weak bonds formed between the $H_2O$ molecules, gases, and minerals when the water is relatively quiescent.

My U.S. Pat. No. 4,261,521 discloses and describes a pair of vortex nozzles which are similar in construction and operate to impart a rotation to water passing through them. The nozzles are positioned in an opposed relationship so that the water streams exiting the nozzles rotate in opposite directions. The nozzles further function to expel the oppositely rotating water streams at a high velocity and collide the two streams at approximately halfway between the nozzle outlets. That collision between the counter-rotating streams creates compression waves throughout the water which coupled with the high centrifugal velocity of the counter-rotating streams imparts a large amount of kinetic energy to the $H_2O$ molecules, gases, and minerals. In addition, the compression waves produce a shearing action which aids in tearing apart the molecular structure of the liquid water. Thus, the compression waves and resulting increase of kinetic energy facilitate the breaking of the bonds between the individual water molecules, the water molecules and the entrained gases, and the water molecules and the dissolved minerals.

Specifically, the compression waves alternately compress and expand the $H_2O$ molecules, entrained gases, and dissolved minerals, thereby, increasing their individual temperature. That increased temperature is reflected by increased electron energy and activity in the valence shells of the bonded $H_2O$ molecules, gases, and minerals. Because the added heat has no release into the atmosphere, the temperature of the $H_2O$ molecules, gases, and minerals continues to accumulate further increasing valence electron energy and activity. The accumulated heat/energy can only be dissipated through the release of the excited valence electrons. However, any release will break the bonds between the $H_2O$ molecules, gases, or minerals sharing those valence electrons, and further cause the breaking of some of the bonds formed between the hydrogen and oxygen atoms comprising the $H_2O$ molecules and the atoms comprising the gas molecules. Thus, at some point when sufficient heat has accumulated, valence electrons will be released to become free electrons, breaking the bonds formed between the $H_2O$ molecules, gases, and minerals. The initial breaking of a few bonds weakens other bonds, which aided by the shearing force of the compressional waves facilitates the further release of valence electrons, thus, rending the tetrahedral array and breaking the liquid water into its constituent parts (i.e. $H_2O$ molecules, hydrogen atoms, oxygen atoms, gas atoms, and minerals) and free electrons. The release of electrons is of extreme importance because it creates many ions, both positive and negative, in the water.

The above constituent parts, upon exiting the vortex nozzle arrangement, begin to recombine, however, because of the increased energy imparted to the system resulting in the free roaming electrons and water ionization, the tetrahedral array reforms without many of the gases being entrained or the minerals returning to solution.

First, many of the ionized gas atoms combine with other atoms or ionized atoms and free electrons to form gas molecules having increased energy and molecular movement. That increased energy and molecular movement provide the gas molecules with sufficient force to escape from the liquid water and return in their gaseous form to the atmosphere.

Second, the minerals agglomerate, thus, appearing in the liquid water as solids. The individual ionized elemental mineral atoms combine in sufficient numbers to form either a solid element or a solid compound depending upon the particular atoms involved.

Finally, because the entrained gases have been released into the atmosphere and the dissolved minerals have been agglomerated to return to their solid form, the hydrogen atoms, oxygen atoms, and remaining $H_2O$ molecules reform the tetrahedral array developed in undisturbed water without any impurities. My U.S. Pat. No. 4,261,521, therefore, softens water by releasing entrained gases and agglomerating dissolved minerals.

Unfortunately, the agglomerated minerals are very fine, being on the order of one to ten microns, and settle very slowly which makes them difficult to remove from the liquid. Thus, if the agglomerated minerals are removed from the bottom of a reservoir using a technique such as suction, long holding times are required, or if filtration is employed, removal is difficult because of the small agglomerate size. Additionally, insufficient amounts of entrained gases are removed.

Hence, while my U.S. Pat. No. 4,261,521 has been effective in removing entrained gases and minerals in suspension, it is desirable to produce nozzles which remove even more entrained gases and minerals from solution and increase mineral agglomeration to enhance their removal by filtration or settling. My new invention is designed to accomplish that. While the primary focus of the invention is in the treatment of water primarily for human consumption, it should be understood that other liquids may be treated in like manner for various purposes, many of which were discussed in my earlier patents.

SUMMARY OF THE INVENTION

The present invention deals primarily with the production of potable water and includes not only an apparatus for the removal of minerals such as calcium, iron, sulphur, and manganese and gases such as nitrogen and carbon dioxide, but also provides a means for killing bacteria in the water.

One of the reasons for the removal of certain minerals, specifically calcium, is to prevent its depositing on pipes, coffee pots, and other metal surfaces. It is also necessary to remove minerals of all types to soften the water for laundry purposes. In addition, and more importantly, minerals which produce unpleasant odors, taste, and color may be removed.

My new invention comprises a pair of vortex nozzles of essentially identical design which impart a rotation in the same direction to water passing through them. The nozzles, however, are positioned in opposed relationship so that the direction of rotation of the water streams exiting the nozzles is opposite. The nozzles are each provided with at least one pair of slots which extend through the wall of the vortex nozzles. Each individual slot communicates with a chamber about the vortex nozzles which in turn communicates through a conduit with the exit stream of the nozzles. The addition of the slots to the nozzles solves the problem encountered in my U.S. Pat. No. 4,261,521. Namely, additional entrained gases are removed and mineral agglomerate size is significantly increased.

The slots operate to remove a fraction of the water from the rotating streams as they circulate about the nozzles prior to expulsion. The bled-off water which is a product of interface chemistry is then reintroduced via the chamber and conduit of each nozzle, to the single water stream created beyond the impingement point of the two counter-rotating streams. In removing a small nozzles, the slots, essentially, bleed-off some $H_2O$ molecules as well as many of the free electrons and elemental ions created through the collision of the two counter-rotating streams. That occurs because the bond breaking process described above in reference to my U.S. Pat. No. 4,261,521 is not limited to the impingement point of the counter-rotating streams. The compressional waves which are largely responsible for the increased kinetic energy and shearing effect that destroy the bonds between the molecules and atoms continually travel throughout the two rotating streams. This means that the compressional waves break bonds at any location in the input water streams, thereby releasing free electrons and creating positive and negative ions throughout the entire input water streams.

The slots in removing $H_2O$ molecules, free electrons, and ions from the two rotating streams serve a twofold purpose. First, the extraction of $H_2O$ molecules, free electrons, and ions enhances the ability of the compressional waves to further separate the liquid water into its constituent parts because their removal weakens the remaining bonds. The remaining bonds are weakened because the removal of charge (i.e. free electrons and ions) from the rotating streams creates a charge void which allows the orbital distances between the bonded molecules, atoms, and valence electrons of the atoms to lengthen. Larger orbital distances mean that the cohesive forces keeping the molecules and atoms bonded together and the valence electrons orbiting about their atom's nucleus are greatly diminished. That translates into a lower energy threshold which must be overcome by the kinetic energy and shear forces of the compressional waves before bond breaking occurs. Thus, the weakening of the remaining bonds results in significantly larger numbers of broken bonds and attendant release of free electrons and creation of ions.

Second, the reintroduction of the $H_2O$ molecules, free electrons, and ions at a location beyond the counter-rotating streams' impingement point significantly increases the removal of entrained gases and agglomeration of the minerals. As previously described, the gas atoms and ions and free electrons combine with sufficient energy to escape the bonding forces of the liquid water and, therefore, return to the atmosphere. The mineral ions also combine to form elemental or compound solids. By introducing more ions and free electrons after most of the recombining has occurred, the above process which results in the escape of entrained gases and agglomeration of minerals continues even further. For example, once several ions have formed a solid compound, the charge of that compound is balanced, or in other words canceled to zero. However, when free electrons or other ions are introduced, the electrically balanced compounds are prone to capture free electrons and once again become ionized. The re-ionized compound will seek an introduced oppositely charged ion or previously formed compound in an effort to balance its extra charge. Once an oppositely charged atom or compound is found, the two particles will bond, thereby, creating a solid compound larger than before. That bonding process will continue as long as additional free electrons and ions are introduced by the slots which means that repeated passes through the nozzles will improve the results. Thus, it should be apparent that rather large elemental or compound solids will be formed during the operation of the present invention. Such solids are easily removed by settling or filtration. The introduction of slots into the nozzle arrangement of the present invention, therefore, greatly enhances the removal of entrained gases and significantly increases the ability of the minerals in solution to form solids and further agglomerate.

The slotted vortex nozzle design may be incorporated into numerous systems such as cooling towers, water softeners, potable water systems and the like. A water softening and treating system is disclosed and described herein. The system may be either self contained for small installations such as individual residences or it may be custom designed for larger installations. It may also be designed for both water softening water and treatment for bacteria.

DETAILED DESCRIPTION OF THE PREFERRED EMBODIMENT

Figure 1:
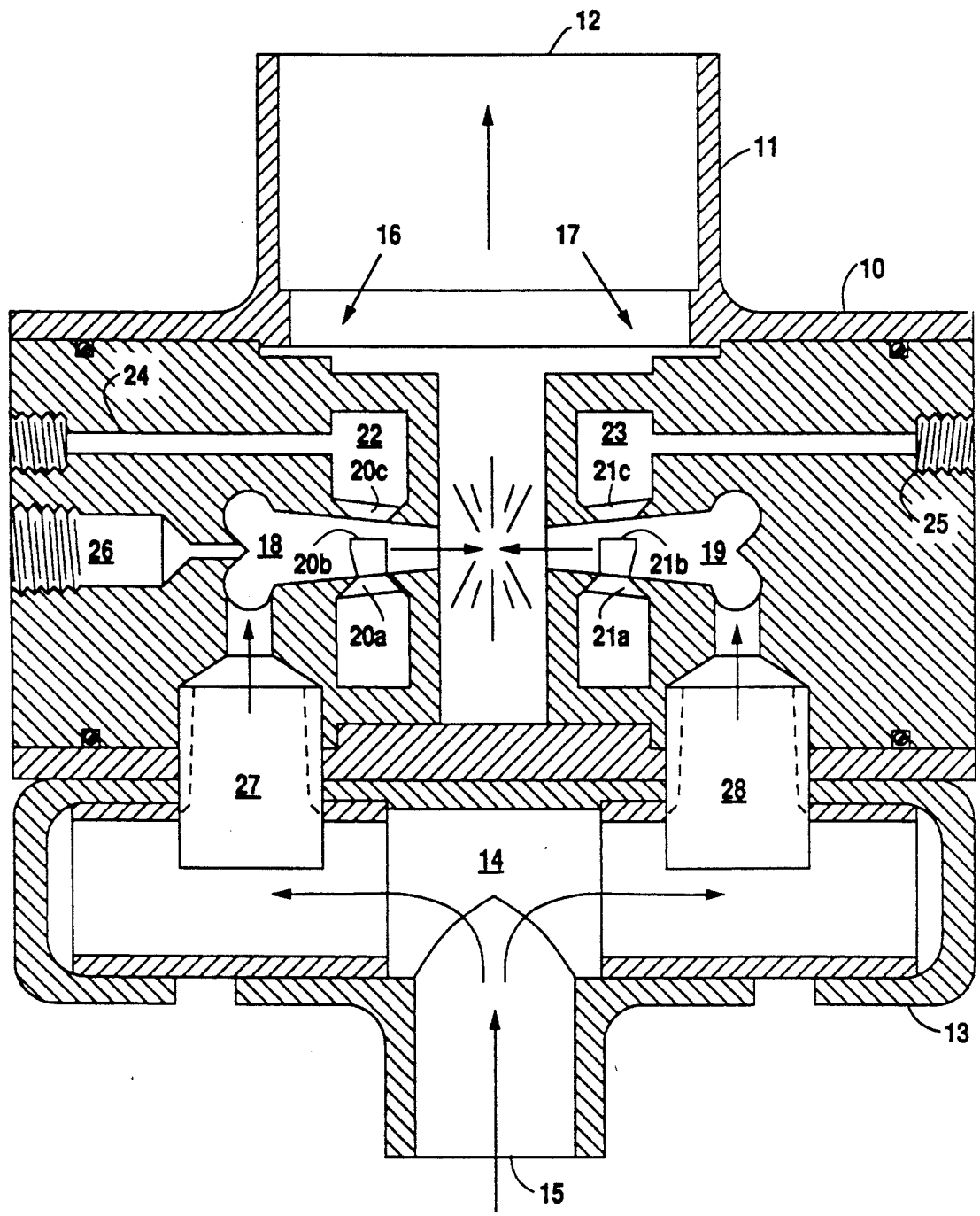
FIG. 1 is a cross-sectional side view of the vortex nozzle unit according to the preferred embodiment of the present invention.

Referring to FIG. 1, the modified vortex nozzle unit according to the preferred embodiment of the present invention will be described. The basic structure and function of the vortex nozzle unit is described more fully in my U.S. Pat. Nos. 4,261,521 and 4,957,626, the disclosures of which are herein incorporated by reference.

The vortex nozzle unit of the present invention comprises cylindrical body portion 10 having outlet portion 11 defining an outlet 12 at one end. Coupled to the opposite end of cylindrical body portion 10 is inlet portion 13. Inlet portion 13 defines chamber 14 and has an inlet 15 which may be attached to any suitable fluid source such as a well or public water source. Outlet 12 may be attached to any suitable reservoir or any suitable fluid delivery means such as a faucet, shower, or hose. While the vortex nozzle arrangement of the present invention may be used to disentrain gases and agglomerate solids in solution for any fluid, for the purposes of disclosure, the fluid described will be water.

Positioned at each side of cylindrical body 10 are vortex nozzles assemblies 16 and 17. The structure of vortex nozzle assemblies 16 and 17 and their positioning within cylindrical body portion 10 are fully described in my U.S. Pat. Nos. 4,261,521 and 4,957,626. Vortex nozzles assemblies 16 and 17 operate identically to and have the same structure as my prior nozzle assemblies, except vortex nozzle 18 comprises slots 20A-C and a fourth (not shown) and vortex nozzle 19 comprises slots 21A-C and a fourth (not shown). The four slots of vortex nozzle 18 communicate with chamber 22 and the four slots of vortex nozzle 19 communicate with chamber 23 to bleed off a portion of the water streams rotating through vortex nozzles 18 and 19. Conduits 24 and 25 communicate with chambers 22 and 23, respectively, to provide a passageway for the bled-off water to be removed from chamber 22 and 23. Conduits 24 and 25 are connected to any suitable piping system (see FIG. 2) which will deliver the bled-off water back into the output stream received from output portion 11 through outlet 12. Vortex nozzle assembly 16 is further provided with conduits 26 which communicates with the rear of vortex nozzle 18. Conduit 26 may be connected to any suitable means (discussed herein) to deliver a bacteria killer such as chlorine to the water stream entering vortex nozzle assembly 16.

Thus, in operation, water is pumped into chamber 14 through inlet 15, where the entering water stream is divided into two. The rears of vortex nozzles 18 and 19 are connected to chamber 14 of inlet portion 13 via passageways 27 and 28, respectively. Passageways 27 and 28 function to deliver the divided water streams to the rear of vortex nozzles 18 and 19. The streams entering vortex nozzle 18 from passageway 27 and vortex nozzle 19 from passageway 28 are both rotated in the same direction by the two vortex nozzles. However, because vortex nozzles 18 and 19 are positioned in an opposed relationship, the water streams exiting the nozzles are rotating oppositely before their collision approximately half-way between the two vortex nozzle outlets. The colliding streams form a single stream which exits vortex nozzle assemblies 16 and 17 via outlet 12 in outlet portion 11.

Additionally, as the streams rotate about vortex nozzles 18 and 19 before exiting, a small portion of the streams escape through the slots and into chambers 22 and 23. As chambers 22 and 23 fill up, the escaped water is forced through conduits 24 and 25. The connections to conduits 24 and 25 (discussed herein) returns the water to the mixed streams at a location beyond outlet portion 11. As previously described, the water flow from the slots into chambers 22 and 23 and out conduits 24 and 25 contains a large amount of free electrons and ions which when reintroduced into the exit stream greatly enhance the disentrainment of gases and the agglomeration of solids.

Figure 2:
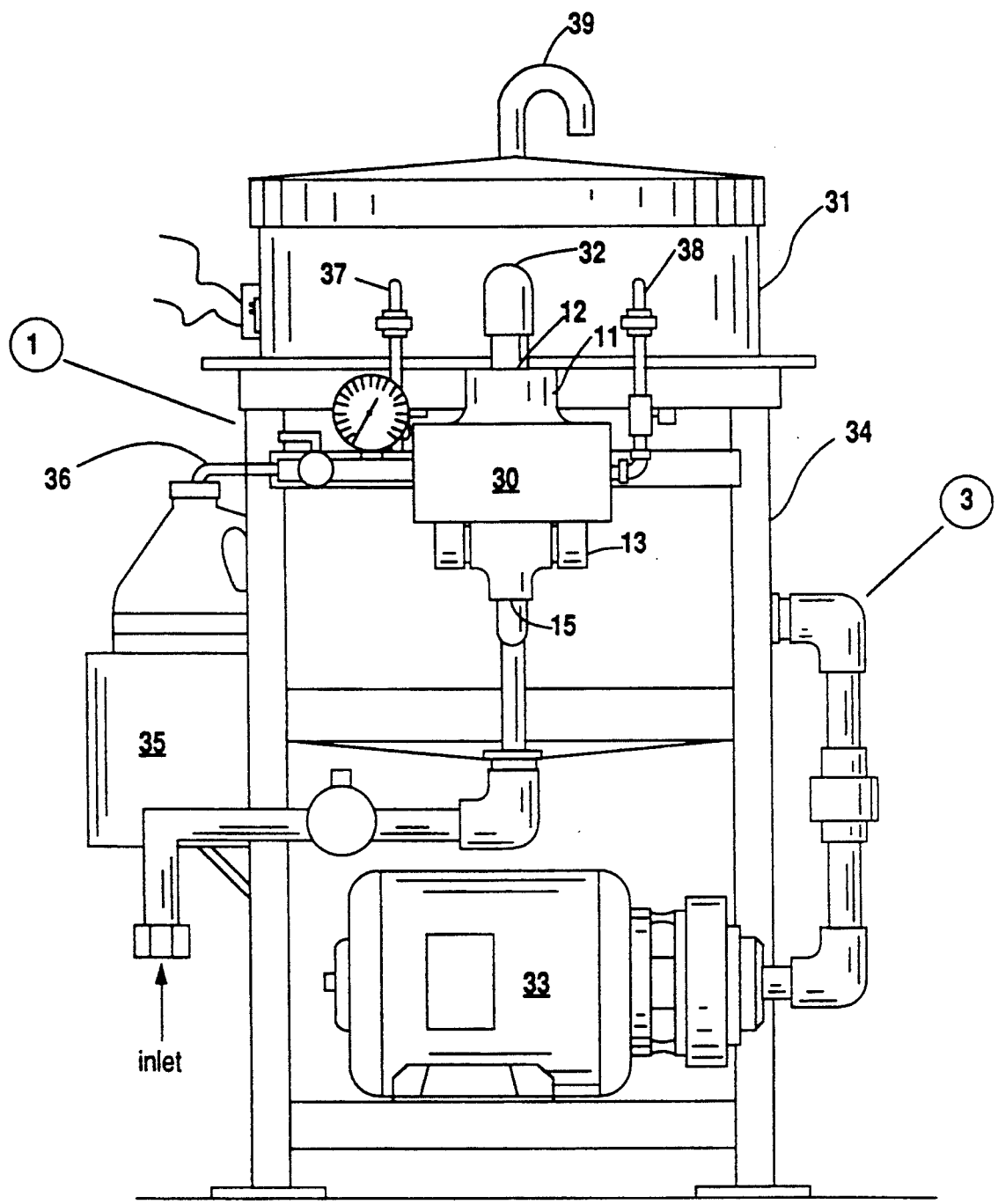
FIG. 2 is a front view of a water softening and chlorinating system employing the vortex nozzle unit according to the preferred embodiment of the present invention.

Referring to FIG. 2, a water softener and chlorinator system using the vortex nozzle unit of the present invention will be described. The water softener and chlorinator system shown in FIG. 2 comprises a support housing 34 which supports a reservoir tank 31 and pump 33 connected to the outlet of reservoir tank 31. Connected to the outside of support housing 34 is nozzle unit 30 which communicates with a water source (not shown). The water source, which may be publicly delivered water, is connected to inlet portion 13 to deliver water to vortex nozzle assemblies 16 and 17 through inlet 15 as previously described. Outlet portion 11 communicates water to reservoir tank 31 through pipe 32 which is connected to outlet 12. Reservoir tank 31 is provided with vent 39 which allows the treated water to communicate with the atmosphere. Support housing 34 is further provided with holder 35 which supports an ordinary household bottle of chlorine. The bottle of chlorine is connected to conduit 26 of vortex nozzle assembly 16 (see FIG. 1) through pipe 36. Also attached to nozzle unit 30 are pipes 37 and 38. Pipes 37 and 38 connect with conduits 24 and 25 (see FIG. 1), respectively, to deliver the water bled-off by the slots back into tank reservoir 31, thereby, enhancing the disentrainment of gas and agglomeration of solids as previously described.

In operation, pump 33 pumps water from tank 31 on a demand basis. Responsively, water from the public system enters nozzle unit 30 where vortex nozzle assemblies 16 and 17 (see FIG. 1) collide the water to remove entrained gases and agglomerate dissolved minerals as previously described. Additionally, during the pumping, a small amount of chlorine is drawn from the chlorine bottle and injected into the water through conduit 26 which communicates with the back of vortex nozzle 18 (see FIG. 1). Furthermore, Pipes 37 and 38 introduce the water bled off by the slots into tank 31, thus, enhancing the removal of entrained gases and agglomeration of minerals in solution. The disentrained gases escape to the atmosphere through vent 39 of reservoir tank 31. Although not shown, a filter could also be provided between the tank and the ultimate user to remove the agglomerated solids, thereby, producing softened water having had a substantial amount of bacteria killed through the addition of chlorine.

Figure 3:
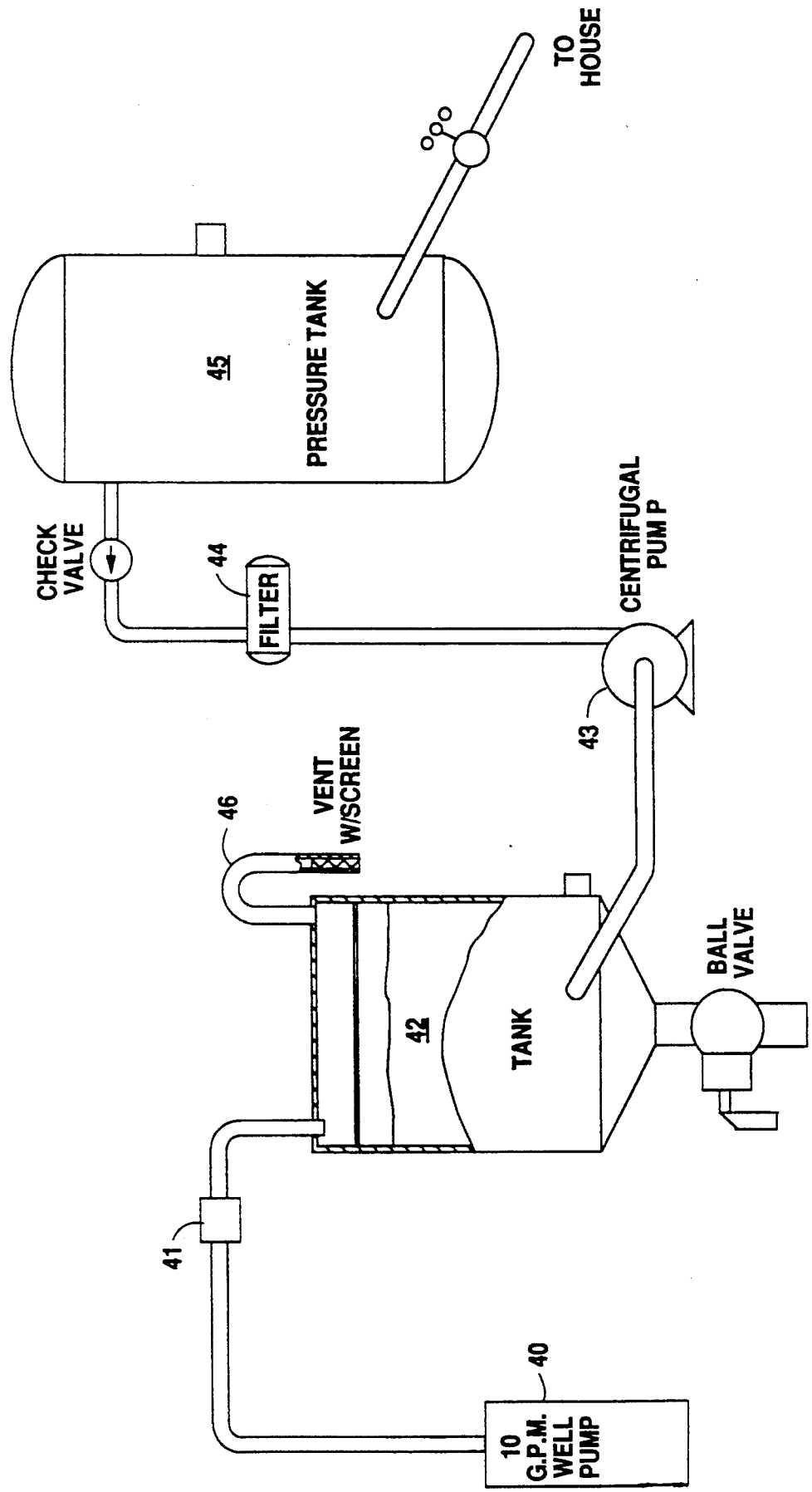
FIG. 3 is a schematic of a well water softening system employing the vortex nozzle unit according to the preferred embodiment of the present invention.

Referring to FIG. 3, a water softener employing the nozzle unit of the present invention for use with an underground well will be described. Based on demand, well pump 40 pumps water from a well through nozzle unit 41 (see FIG. 1 and accompanying description) whose outlet dumps into storage tank 42. Storage tank 42 is provided with vent 46 which allows the disentrained gases to escape into the atmosphere. Pump 43, placed at the output of tank 42, pumps the treated water through filter 44 which removes the agglomerated solids before the water enters pressure tank 45. Pressure tank 45 connects to an ordinary water user such as a household to store the softened water before use.

From the foregoing description and illustrating of this invention, it should be apparent that various modifications may be made by reconfigurations or combinations to produce similar results. It is, therefore, the desire of Applicant not to be bound by the description of this invention as contained in this specification, but to be bound only by the claims as appended hereto.

I claim:

1. An apparatus for removing entrained gases from a fluid and agglomerating solids dissolved in the fluid, comprising:

a first vortex nozzle having an inlet communicating with a fluid source and an outlet communicating with a fluid reservoir wherein said first vortex nozzle rotates a first fluid stream flowing through said first vortex nozzle;

a second vortex nozzle positioned in opposed relation to said first vortex nozzle, said second vortex nozzle having an inlet communicating with said fluid source and an outlet communicating with said fluid reservoir wherein said second vortex nozzle rotates a second fluid stream flowing through said second vortex nozzle to collide the first and second fluid streams, wherein said first and second vortex nozzles are arranged to remove entrained gases from said first and second fluid streams and agglomerate solids in said first and second fluid streams and said first vortex nozzle including means interposed to its inlet and outlet for removing a portion of the first fluid stream and introducing the removed portion into said fluid reservoir to enhance the removal of entrained gases and the agglomeration of dissolved solids.

2. The apparatus according to claim 1 wherein said means for removing a portion of the first fluid stream from said first vortex nozzle, comprises:

a slot extending through said first vortex nozzle into a chamber positioned about said vortex nozzle, said slot communicating the removed portion of the first fluid stream into said chamber; and conduit means interposed to said chamber and said fluid reservoir for communicating the removed portion to said fluid reservoir.

3. The apparatus according to claim 2, wherein said slot defines opposed sidewalls extending from said first vortex nozzle and opposed arcuate endwalls extending form the outer surface of said first vortex nozzle, said opposed sidewalls and opposed arcuate endwalls meeting to form a passageway for allowing fluid communication from said first vortex nozzle to said chamber positioned about said vortex nozzle.

4. The apparatus according to claim 1 wherein said first vortex nozzle defines a circular wall having an inner and outer surface.

5. The apparatus according to claim 1 wherein said second vortex nozzle includes means interposed to its inlet and outlet for removing a portion of the second fluid stream and introducing the removed portion into said fluid reservoir to enhance the removal of entrained gases and the agglomeration of dissolved solids.

6. The apparatus according to claim 5 wherein said means for removing a portion of the second fluid stream from said second vortex nozzle, comprises:

a slot extending through said second vortex nozzle into a chamber positioned about said second vortex nozzle, said slot communicating the removed portion of the second fluid stream into said chamber; and conduit means interposed to said chamber and said fluid reservoir for communicating the removed portion to said fluid reservoir.

7. The apparatus according to claim 6, wherein said slot defines opposed sidewalls extending from said second vortex nozzle and opposed arcuate endwalls extending from the outer surface of said second vortex nozzle, said opposed sidewalls and opposed arcuate endwalls meeting to form a passageway for allowing fluid communication from said second vortex nozzle to said chamber positioned about said second vortex nozzle.

8. The apparatus according to claim 1 wherein said second vortex nozzle defines a circular wall having an inner and outer surface.

9. The apparatus according claim 1 wherein said second vortex nozzle rotates the second fluid stream in a direction opposite to the first fluid stream.

10. An apparatus for treating fluids comprising:

a fluid reservoir;

a pump coupled to a fluid source;

a first vortex nozzle having an inlet communicating with said pump and an outlet communicating with said fluid reservoir wherein said first vortex nozzle rotates a first fluid stream pumped through said first vortex nozzle by said pump;

a second vortex nozzle positioned in opposed relation to said first vortex nozzle, said second vortex nozzle having an inlet communicating with said pump and an outlet communicating with said fluid reservoir wherein said second vortex nozzle rotates a second fluid stream pumped through said second vortex nozzle by said pump to collide the first and second fluid stream streams, wherein said first and second vortex nozzles are arranged to remove entrained gases from said first and second fluid streams and agglomerate solids in said first and second fluid streams;

said first vortex nozzle including means interposed to its inlet and outlet for removing a portion of the first fluid stream and introducing the removed portion into said fluid reservoir to enhance the removal of entrained gases and the agglomeration of dissolved solids; and means for delivering said treated fluid to a fluid user.

11. The apparatus according to claim 10 further comprising a filter positioned in said fluid delivery means.

12. The apparatus according to claim 10 further comprising a disinfectant source coupled to said first and second vortex nozzles to add disinfectant to the fluid treated by said first and second vortex nozzles.

13. The apparatus according to claim 10 wherein said fluid reservoir includes a vent.

14. The apparatus according to claim 10 wherein second vortex nozzle includes means interposed to its inlet and outlet for removing a portion of the second fluid stream and introducing the removed portion into said fluid reservoir to enhance the removal of entrained gases and the agglomeration of dissolved solids.

* * * * *